(No Model.)

D. A. JOHNSON.
FLYING TARGET.

No. 282,000. Patented July 24, 1883.

WITNESSES:
Chas. R. Burr
E. A. Dick

INVENTOR:
Daniel A. Johnson
by Marcellus Bailey
his Attorney.

UNITED STATES PATENT OFFICE.

DANIEL A. JOHNSON, OF BOSTON, MASSACHUSETTS, ASSIGNOR OF ONE-FOURTH TO RUFUS S. MERRILL, OF SAME PLACE.

FLYING TARGET.

SPECIFICATION forming part of Letters Patent No. 282,000, dated July 24, 1883.

Application filed May 31, 1883. (No model.)

*To all whom it may concern:*

Be it known that I, DANIEL A. JOHNSON, of Boston, in the State of Massachusetts, have invented certain new and useful Improvements in Flying Targets, of which the following is a specification.

This invention relates to devices known as "flying targets," which are designed to be shot at, like glass balls and other contrivances of similar character.

The device in which my invention is embodied may be described as a hollow flying target composed of glass or other fragile or easily-frangible material, which is round or ellipsoidal in form through its greatest diameter, with flattened irregular sides, and with a flange formed in or on it by which it may be held and thrown.

Figure 1:
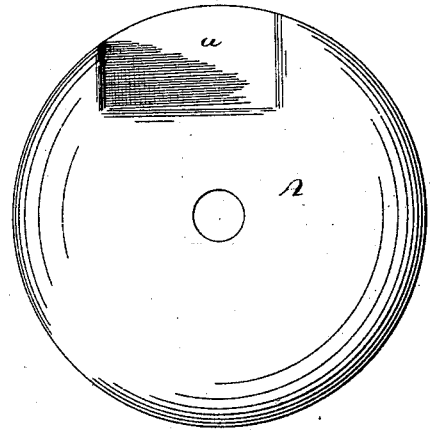
Figure 2:
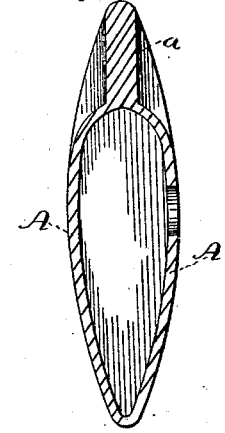
Figure 3:
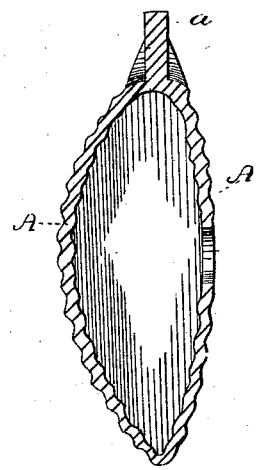
Figure 4:
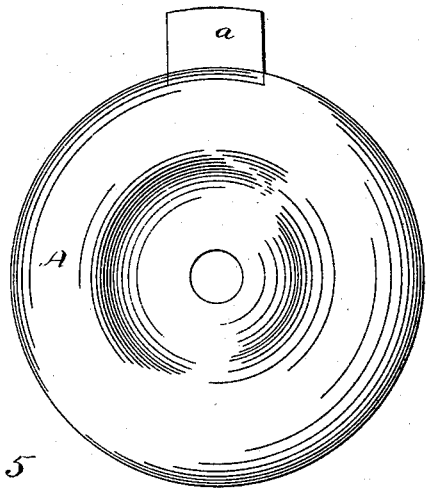
Figure 5:
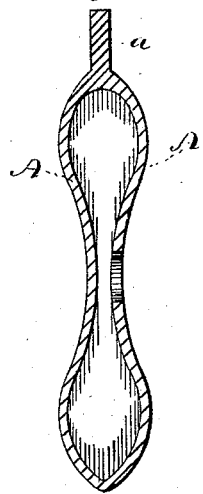

In the accompanying drawings, Figure 1 is a plan of the flying target embodying my invention. Fig. 2 is a central cross-section. Fig. 3 is a similar section of a modified form of target. Fig. 4 is a plan, and Fig. 5 is a cross-section, of still another modification.

In all of these various forms the target is shown as cylindrical in form through its greatest diameter, although, as hereinbefore intimated, it may be ellipsoidal or oval. It is made of glass or other easily-frangible material, and is hollow. It is provided with flattened irregular sides or faces A A, which may have the form indicated in Figs. 1 and 2, or may be corrugated, as indicated in Fig. 3, or may have wavy sinuous outline, (indicated in Figs. 4 and 5.) At a suitable point upon the edge it is provided with a holding-flange, *a*, which may be produced by squeezing and flattening the body of the target at that point, as indicated in Figs. 1 and 2, or by forming the flange so that it shall project from the edge, as indicated in Figs. 4 and 5. The holding-flange can be readily produced in either way at the time the target is made, and while the material of which it is composed is soft or plastic.

A target of this kind can be readily and inexpensively manufactured. It is very irregular in its flight, and is well adapted for use in trap-shooting.

Having now described my invention, what I desire to secure by Letters Patent is—

1. A hollow flying target, of glass or other easily-frangible material, of oblate spheroidal form, with flattened irregular sides or faces A A, as and for the purposes hereinbefore set forth.

2. A hollow flying target, of glass or other easily-frangible material, of oblate spheroidal form, with flattened irregular sides or faces, and flat compressed portion integral with the body of the target and serving as a handle, as and for the purposes hereinbefore set forth.

In testimony whereof I have hereunto set my hand this 26th day of May, 1883.

DANIEL A. JOHNSON.

Witnesses:
 C. S. MOONEY,
 THOMAS H. KEENAN.